United States Patent
Bu et al.

(10) Patent No.: US 7,929,514 B2
(45) Date of Patent: Apr. 19, 2011

(54) METHOD AND APPARATUS FOR MOBILE FLOW RECORD GENERATION AND ANALYSIS

(75) Inventors: Tian Bu, Basking Ridge, NJ (US); Girish Chandranmenon, Edison, NJ (US); Scott Miller, Freehold, NJ (US); Samphel Norden, West Orange, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 115 days.

(21) Appl. No.: 12/495,701

(22) Filed: Jun. 30, 2009

(65) Prior Publication Data
US 2010/0329145 A1 Dec. 30, 2010

(51) Int. Cl.
*H04J 3/24* (2006.01)
(52) U.S. Cl. .................................. 370/349; 370/469
(58) Field of Classification Search .................. 370/241, 370/349, 469, 395.5, 310.2, 328, 338
See application file for complete search history.

(56) References Cited

U.S. PATENT DOCUMENTS

| 2002/0062379 | A1* | 5/2002 | Widegren et al. ............. 709/227 |
| 2002/0120749 | A1* | 8/2002 | Widegren et al. ............. 709/227 |
| 2006/0072550 | A1 | 4/2006 | Davis et al. |
| 2006/0227754 | A1 | 10/2006 | Ko |
| 2007/0115835 | A1* | 5/2007 | Renfrew et al. ............... 370/241 |
| 2009/0088147 | A1 | 4/2009 | Bu et al. |

FOREIGN PATENT DOCUMENTS
GB  2 427 795 A  1/2007

OTHER PUBLICATIONS

The International Search Report and the Written Opinion of the International Searching Authority or the Declaration, PCT/US2010/0038954, Alcatel-Lucent USA, mailed Aug. 3, 2010, 14 pages.

* cited by examiner

*Primary Examiner* — Brenda Pham
(74) *Attorney, Agent, or Firm* — Wall & Tong LLP

(57) ABSTRACT

A method, apparatus, and computer-readable storage medium for generating a mobile flow record for a mobile flow of a mobile node are provided. A method includes receiving information associated with signaling traffic of the mobile node, receiving information associated with bearer traffic of the mobile node, and generating the mobile flow record by correlating the information associated with signaling traffic of the mobile node and the information associated with bearer traffic of the mobile node. The mobile flow record includes IP layer information associated with the mobile flow and wireless layer information associated with the mobile flow.

24 Claims, 5 Drawing Sheets

METHOD AND APPARATUS FOR MOBILE FLOW RECORD GENERATION AND ANALYSIS

FIELD OF THE INVENTION

The invention relates to the field of wireless networks and, more specifically but not exclusively, to tracking flows in wireless networks.

BACKGROUND

Flow tracking in wireline networks is used for network monitoring and management functions, such as network monitoring, traffic accounting, network planning, security, and similar functions. Flow tracking of an Internet Protocol (IP) flow in wireline networks is typically performed using IP flow records, which typically include information such as IP addresses/ports of the endpoints of the IP flows being tracked. For example, an IP flow record is usually represented as a five-tuple including: source IP address, source port, destination IP address, destination port, and protocol.

Disadvantageously, however, IP flow records do not provide adequate information for tracking IP flows in wireless networks. For example, when an IP flow traverses a wireless network, there is no way to associate the IP layer activity of the IP flow with impacts of the IP flow to the underlying wireless network and, furthermore, use of IP addresses alone cannot be used to track wireless subscribers because most IP addresses are assigned to wireless subscribers dynamically when the wireless subscribers sign on to the wireless network. These shortcomings prevent use of IP flow records in wireless networks for wireless resource monitoring and management.

SUMMARY

Various deficiencies in the prior art are addressed through methods, apparatuses, and computer readable mediums for generating a mobile flow record including IP layer information and wireless information.

In one embodiment, a method includes receiving information associated with signaling traffic of the mobile node, receiving information associated with bearer traffic of the mobile node, and generating the mobile flow record by correlating the information associated with signaling traffic of the mobile node and the information associated with bearer traffic of the mobile node. The mobile flow record includes IP layer information associated with the mobile flow and wireless layer information associated with the mobile flow.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

A capability for generating a mobile flow record is provided. This capability enables the IP layer activity of an IP flow in a wireless network to be associated with the impacts of the IP flow to the underlying wireless network. This provides the wireless service provider with better visibility into the wireless network, enabling wireless network management functions, such as network planning functions, network monitoring functions, network anomaly detection functions, traffic analysis functions, network security functions, subscriber billing functions, and the like, as well as various combinations thereof. A capability for analyzing one or more mobile flow records for providing one or more management functions also is provided herein.

Figure 1:
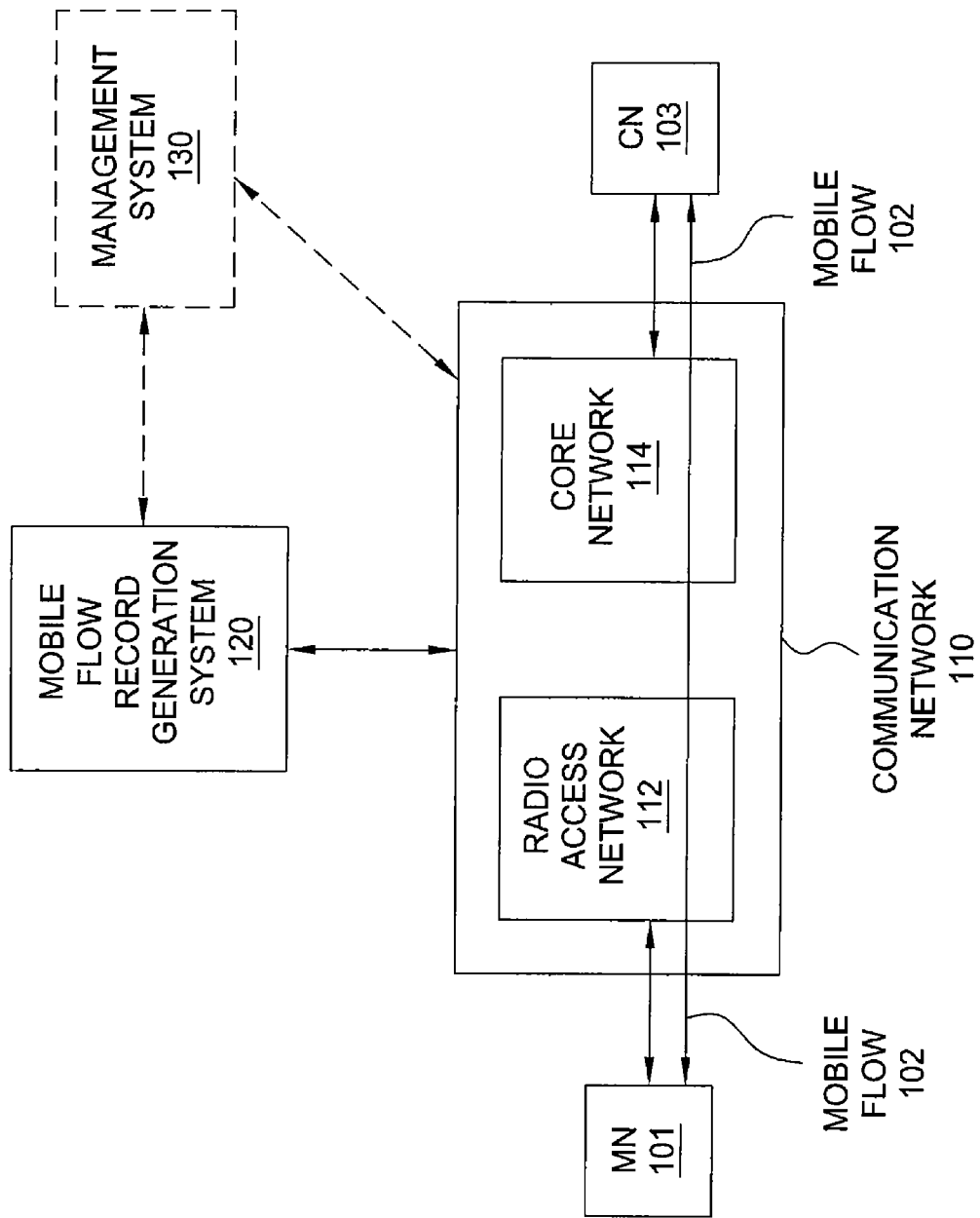
FIG. 1 depicts a high-level block diagram of a wireless communication network architecture including a communication network supporting a mobile flow of a mobile node (MN)

FIG. 1 depicts a high-level block diagram of a wireless communication network architecture. As depicted in FIG. 1, wireless communication network architecture 100 is an exemplary architecture which may be used for providing generation and processing of mobile flow records.

As depicted in FIG. 1, the wireless communication network architecture 100 includes a communication network (CN) 110.

The CN 110 supports a mobile flow 102 between a mobile node (MN) 101 and a correspondent node (CN) 103. The CN 110 includes a radio access network (RAN) 112 and a core network (CN) 114 which support mobile flow 102 between MN 101 and CN 103.

The RAN 112 may be any suitable RAN, such as, for example, a Code Divisional Multiple Access (CDMA) based RAN, a General Packet Radio Service (GPRS) based RAN, a Universal Mobile for Telecommunications (UMTS) based RAN, a Worldwide Interoperability for Microwave Access (WiMAX) based RAN, or any other suitable RAN. The RAN 112 includes various network elements for supporting communications between MN 101 and CN 103. For example, RAN 112 may include elements such as Base Stations (BSs), Radio Network Controller (RNCs), routers, and the like.

The CN 114 may be any suitable CN 114. The CN 114 includes various network elements for supporting communications between MN 101 and CN 103, at least a portion of which may depend on the underlying wireless technology of RAN 112 For example, in a CDMA wireless network, CN 114 may include network elements such as Home Agent (Has), Packet Data Serving Nodes (PDSNs), and the like, as well as various combinations thereof. For example, in a GPRS/UMTS wireless network, CN 114 may include network elements such as Gateway GPRS Support Nodes (GGSNs), Serving GPRS Support Nodes (SGSNs), and the like, as well as various combinations thereof. The CN 114 also may include other network elements, such as Authentication, Authorization, and Accounting (AAA) servers, routers, and the like.

The implementations of RAN 112 and CN 114 are omitted for purposes of clarity. Furthermore, it will be appreciated that the exact implementations of RAN 112 and/or CN 114 may depend on one or more factors, such as the type of underlying wireless technology, provider-dependent implementation conditions, and the like, as well as various combinations thereof. In this manner, CN 110 is intended to represent any and all such implementations which may be used for supporting communications for a mobile node.

The MN 101 may be any mobile node, such as a cellular phone, laptop, PDA, and the like. The CN 103 may be any node with which MN 101 may communicate, such as another mobile node of an end-user, a network node (e.g., content server, application server, and the like), or any other suitable node.

The MN 101 has signaling traffic associated therewith. The signaling traffic is associated with signaling taking place between MN 101 and RAN 112 and within RAN 112. For example, the signaling traffic may be associated with signaling performed for mobile sign-on and sign-off by MN 101 to/from the network, mobility of the MN 101, radio channel allocation/de-allocation for MN 101, and the like, as well as various combinations thereof. It will be appreciated that the signaling traffic associated with MN 101 may include other types of signaling traffic.

The mobile flow 102 has bearer traffic associated therewith. The bearer traffic is traffic conveying content of the mobile flow (e.g., packets conveying voice, data, video, and the like, as well as various combinations thereof). The signaling traffic associated with MN 101 also may be considered to be associated with mobile flow 102 in the sense that the signaling traffic enables MN 101 to access CN 110 for participating in the mobile flow 102.

Although primarily depicted and described herein with respect to the case in which MN 101 is participating in a single mobile flow 102, it will be appreciated that MN 101 may participate in multiple mobile flows (which are omitted herein for purposes of clarity). Thus, it will be further appreciated that, since MN 101 may participate in multiple mobile flows while accessing CN 110, the signaling traffic associated with the MN 101 may therefore be associated with multiple mobile flows (e.g., mobile flow 102 as well as other mobile flows in which MN 101 may participate).

As depicted in FIG. 1, the wireless communication network architecture 100 includes a mobile flow record generation system (MFRGS) 120.

The MFRGS 120 communicates with CN 110 and, optionally, with one or more management systems (e.g., for receiving information adapted for use in generating mobile flow records, for providing mobile flow records to the one or more management systems to enable one or more management systems to provide management functions using mobile flow records, and the like).

The MFRGS 120 generates a mobile flow record for mobile flow 102. The mobile flow record includes mobile flow record information. The mobile flow record information that is included in a mobile flow record is determined from information adapted for use in generating the mobile flow record (denoted herein as raw mobile flow information). The generation of a mobile flow record for a mobile flow is described in further detail hereinbelow.

A mobile flow record for a mobile flow includes mobile flow record information, which includes IP layer information and wireless layer information for the mobile flow.

The IP layer information may include any information associated with the IP layer of the mobile flow. For example, the IP layer information may include one or more of: a five-tuple (e.g., source IP address, source port, destination IP address, destination port, and protocol), the arrival time of the first packet of the mobile flow and/or the arrival time of the last packet of the mobile flow (on each direction of the mobile flow), packet/byte counts of the mobile flow, one or more TCP flags, and the like, as well as various combinations thereof. The IP layer information may include any other suitable information associated with the IP layer of the mobile flow.

The wireless layer information may include one or more of the following types of information: information indicative of wireless resource consumption of the mobile flow in the wireless network, identity information associated with the mobile flow in the wireless network, information indicative of the path traversed by the mobile flow in the wireless network, and the like, as well as various combinations thereof.

The information indicative of wireless resource consumption of the mobile flow in the wireless network may include information such as airtime usage indicating the uplink/downlink contributions of the mobile flow to air resource consumption.

The identity information associated with the mobile flow in the wireless network may include the identity of the subscriber(s) and/or the identity of the mobile device(s) of the mobile flow.

In a CDMA wireless network, for example, the identity information for a subscriber/mobile may include information such as a Network Access Identifier (NAI), an Electronic Serial Number (ESN), Mobile Station Identifier (MSID), and a Mobile Equipment Identifier (MEID), as well as any other parameters associated with subscriber/mobile identity in a CDMA wireless network.

In a UMTS wireless network, for example, the identity information for a subscriber/mobile may include information such as an International Mobile Subscriber Identity (IMSI), an International Mobile Equipment Identity (IMEI), a Mobile Subscriber Integrated Services Digital Network Number (MSISDN), as well as any other parameters associated with subscriber/mobile identity in a CDMA wireless network.

It will be appreciated that the identity information may be different in other types of wireless networks.

The information indicative of the path traversed by the mobile flow in a CDMA wireless network may include, for example, information such as the Home Agent to which the mobile node is attached, the PDSN traversed by the mobile flow, the RNC traversed by the mobile flow, the BS traversed by the mobile flow, and the like, as well as various combinations thereof.

The information indicative of the path traversed by the mobile flow in a GPRS/UMTS wireless network may include, for example, information such as the GGSN to which the mobile node is attached, the SGSN traversed by the mobile flow, the RNC traversed by the mobile flow, the BS traversed by the mobile flow, and the like, as well as various combinations thereof.

The wireless layer information also may include other information, such as one or more performance metrics (e.g., throughput, delay, loss, and the like) or any other suitable wireless layer information, as well as various combinations thereof.

As described herein, the mobile flow record information of a mobile flow may be determined from raw mobile flow information.

The raw mobile flow information may include any information suitable for use in generating the mobile flow record. For example, raw mobile flow information may include information that is included in the mobile flow record (examples of which are described hereinabove) and/or information adapted for use in obtaining or determining information that is included in the mobile flow record.

The raw mobile flow information may be received from any suitable source(s) of such information.

In one embodiment, for example, at least a portion of the raw mobile flow information is extracted from signaling messages exchanged between network elements of the communication network traversed by the mobile flow for which the mobile flow record is generated.

In one such embodiment, for example, the system that generates the mobile flow record may snoop portions of the raw mobile flow information in one or more messages provided by one or more network elements of the communication network traversed by the mobile flow.

In another such embodiment, for example, the system that generates the mobile flow record may be implemented as a tap(s) on one or more network elements of the communication network traversed by the mobile flow.

The raw mobile flow information may be received from the network element(s) of the communication network traversed by the mobile flow for which the mobile flow record is generated in any other suitable way, which may include a combination of such methods.

In the exemplary network of FIG. 1, for example, MFRGS 120 may receive (e.g., obtain, snoop, and the like (raw mobile flow information from one or more network elements of RAN 112 (e.g., one or more of BSs, RNCs, routers, and the like) and/or from one or more network elements of CN 114 (e.g., one or more of HAs, GGSNs, PDSNs, SGSNs, AAA servers, and the like).

In one embodiment, for example, at least a portion of the raw mobile flow information is received from one or more management systems (e.g., one or more management systems associated with the communication network traversed by the mobile flow for which the mobile flow record is generated).

In one such embodiment, for example, the system that generates the mobile flow record may receive at least a portion of the raw mobile flow information by querying one or more management systems (e.g., using information from one or more network elements of the communication network traversed by the mobile flow to query the one or more management systems).

In another such embodiment, for example, the system that generates the mobile flow record may receive at least a portion of the raw mobile flow information from one or more management systems where the one or more management systems periodically provide raw mobile flow information to the system that generates the mobile flow record.

Although primarily depicted and described herein with respect to embodiments in which the raw mobile flow information is received, obtained, or otherwise determined from remote elements (e.g., elements of CN 110 and/or MS 130), it will be appreciated that at least a portion of the raw mobile flow information which is used for generating a mobile flow record also may be received, obtained, and/or determined locally.

The raw mobile flow information may be processed, in order to generate the mobile flow record, in any suitable manner (e.g., using any suitable information processing techniques, filtering techniques, correlation techniques, and like techniques, as well as various combinations thereof).

In one embodiment, the mobile flow record is generated by receiving IP layer information associated with the mobile node, receiving wireless layer information associated with the mobile node, and generating the mobile flow record by correlating the IP layer information and the wireless layer information. One such embodiment is depicted and described herein with respect to FIG. 2.

As an example, the mapping of the IP address of the mobile node to the subscription and device identities of the mobile node may be learned from the signaling messages associated with the mobile node. This mapping may then be used to associate all mobile flows with the IP address of the mobile node in the period between sign-on to the network by the mobile node and sign-off from the network by the mobile node.

As another example, the current wireless path with which the mobile node is associated may be learned from the signaling messages associated with the mobile node, thereby enabling all mobile flows of the mobile node to be associated to the wireless path.

It will be appreciated that the above-described examples are merely a few examples of the manner in which IP layer information and wireless layer information may be correlated for purposes of generating a mobile flow record.

In one embodiment, the mobile flow record is generated by receiving information associated with signaling traffic of the mobile node, receiving information associated with bearer traffic of the mobile node, and generating the mobile flow record by correlating the information associated with signaling traffic of the mobile node and the information associated with bearer traffic of the mobile node. One such embodiment is depicted and described herein with respect to FIG. 3.

The correlation of information associated with signaling traffic of the mobile node and information associated with bearer traffic of the mobile node for generating a mobile flow record may be performed in any suitable manner. An embodiment of a method of generating a mobile flow record by correlating the information associated with signaling traffic of the mobile node and the information associated with bearer traffic of the mobile node is depicted and described herein with respect to FIG. 4

In one embodiment, at least a portion of the IP layer information is determined using information from at least one of: at least one network element of the radio access network traversed by the mobile flow, and at least one network element of the core network traversed by the mobile flow.

In one embodiment, at least a portion of the wireless layer information is determined using information from at least one of: at least one network element of the radio access network traversed by the mobile flow, and at least one network element of the core network traversed by the mobile flow (e.g., where certain wireless layer information may be determined from information associated with signaling messages exchanged between network elements in the core network). The raw mobile flow information may be processed, in order to generate the mobile flow record, in any other suitable manner which may result in correlation of IP layer information and wireless layer information of a mobile flow to form an associated mobile flow record.

Although primarily depicted and described herein with respect to embodiments in which the mobile flow record information is determined by processing raw mobile flow information, in other embodiments at least a portion of the mobile flow record information may be determined in other ways. For example, at least a portion of the mobile flow record information may be (1) received directly without need for additional processing to identify, extract, determine, or otherwise obtain mobile flow record information for the mobile flow record, (2) determined locally, such as from a database associated with the system that generates the mobile flow record (e.g., where the system that generates the mobile flow record uses raw mobile flow information and/or determined mobile flow record information to query the database for other mobile flow record information), and/or (3) determined in any other suitable manner.

As depicted in FIG. 1, the wireless communication network architecture 100 includes a management system (MS) 130.

The MS 130 communicates with the MFRGS 120 and, optionally, depending on the type of management system, with some or all of the elements of CN 110.

The MS 130 receives mobile flow records from MRFGS 120. The MS 130 uses the mobile flow records for providing various management functions. The MS 130 may propagate mobile flow records and/or information resulting from processing of mobile flow records to one or more other systems (e.g., other management systems, which are omitted for purposes of clarity). The use of mobile flow records for management purposes is described in additional detail hereinbelow.

As described herein, mobile flow records may be utilized to perform wireless network management functions, including network monitoring functions, traffic analysis functions, network security functions, subscriber billing functions, and the like, as well as various combinations thereof.

A mobile flow record associated with a packet flow may be analyzed in any suitable manner for providing wireless network management functions, which may depend on the type of wireless network management function(s) to be performed.

For example, given inclusion of subscriber identity information in mobile flow records, a service provider can aggregate all mobile flow records associated with a particular wireless subscriber and use the aggregated information for usage-based billing, detection of misbehaving devices, and/or other functions.

For example, given inclusion of airtime usage information in mobile flow records, a service provider can profile services/applications based on airtime consumption and properly provision the network (mere volume information, e.g., byte/packet counts, available from existing IP flow records are insufficient for this purpose).

For example, mobile flow records may be used to detect and/or investigate events in the communication network. For example, mobile flow records may be used to understand mobile flow level activity that may lead to the occurrence of an undesirable event in the communication network (e.g., so that preventative action may be taken to prevent the event from occurring).

For example, mobile flow records may be used to investigate events in the communication network. For example, mobile flow records may be used to understand mobile flow level activity that caused an event (e.g., using five-tuples, resource usage information, time information, and like information from mobile flow records, at least a portion of which may depend on the type of event suspected or detected). For example, all mobile flow records associated with an event may be accessed for purposes of better understand the cause of the event.

For example, mobile flow records may be used to identify and control mitigating actions which may be taken in response to a suspected or detected event. For example, mobile flow records may be used to control filtering of a malicious source (e.g., by adding filtering rules to a firewall/IPS, adding filtering rules to a router ACL, and the like). For example, mobile flow records may be used to contact and/or disable a mobile subscriber (e.g., a malicious subscriber, a mobile scanner/slammer that is cycling a large number of addresses in the network, and the like). For example, mobile flow records also may be used to determine that mitigating action is not required.

It will be appreciated that mobile flow records may be used to identify and control various other types of actions which may be taken to manage a wireless network, such as improvement actions for improving quality-of-service provided by the network, and the like, as well as various combinations thereof.

It will be appreciated by one skilled in the art and informed by the teachings herein that the information included in mobile flow records may be used to provide various other wireless network management functions.

As described herein, a mobile flow record may be stored, processed, propagated, and/or displayed, as well as handled in any other suitable manner. An ex graphical user interface illustrating display of exemplary mobile flow records is depicted and described with respect to FIG. 5.

Figure 2:
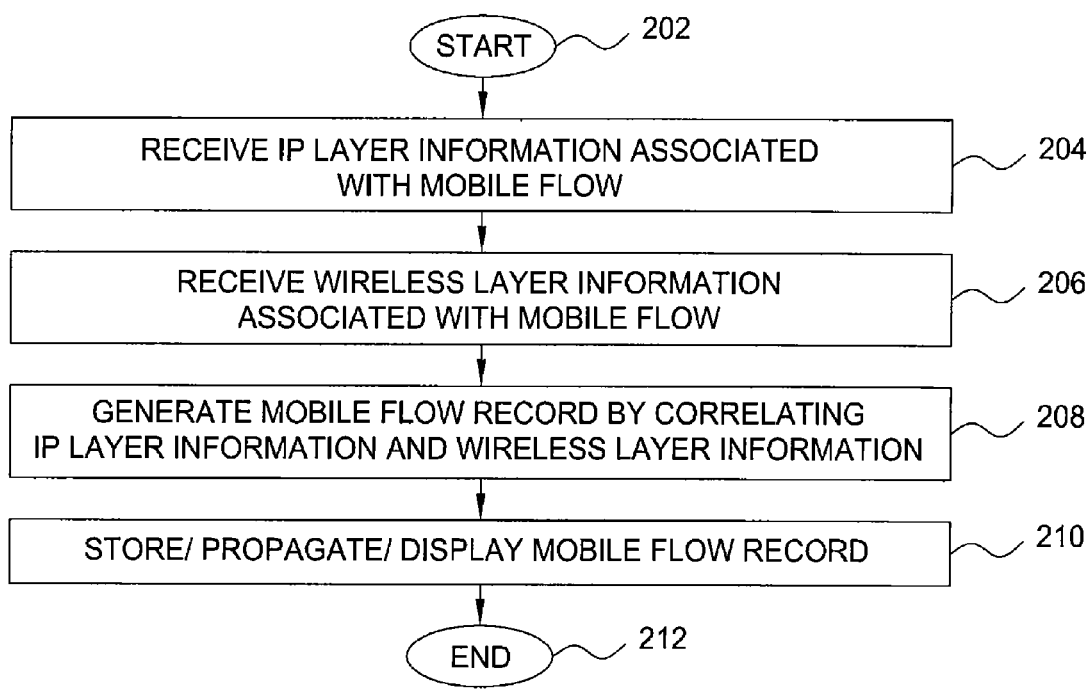
FIG. 2 depicts a high-level block diagram of one embodiment of a method for generating a mobile flow record for a mobile flow of a mobile node.

FIG. 2 depicts a high-level block diagram of one embodiment of a method for generating a mobile flow record for a mobile flow of a mobile node. Although depicted and described as being performed serially, at least a portion of the steps of method 200 may be performed contemporaneously, or in a different order than depicted and described with respect to FIG. 2. The method 200 begins at step 202. At step 204, IP layer information associated with the mobile flow is received. At step 206, wireless layer information associated with the mobile flow is received. At step 208, the mobile flow record is generated by correlating the IP layer information and the wireless layer information. At step 210, the mobile flow record is handled (e.g., stored, propagated, and/or displayed, and the like). At step 212, method 200 ends. The steps of method 200 may be better understood when read in conjunction with the description of FIG. 1.

Figure 3:
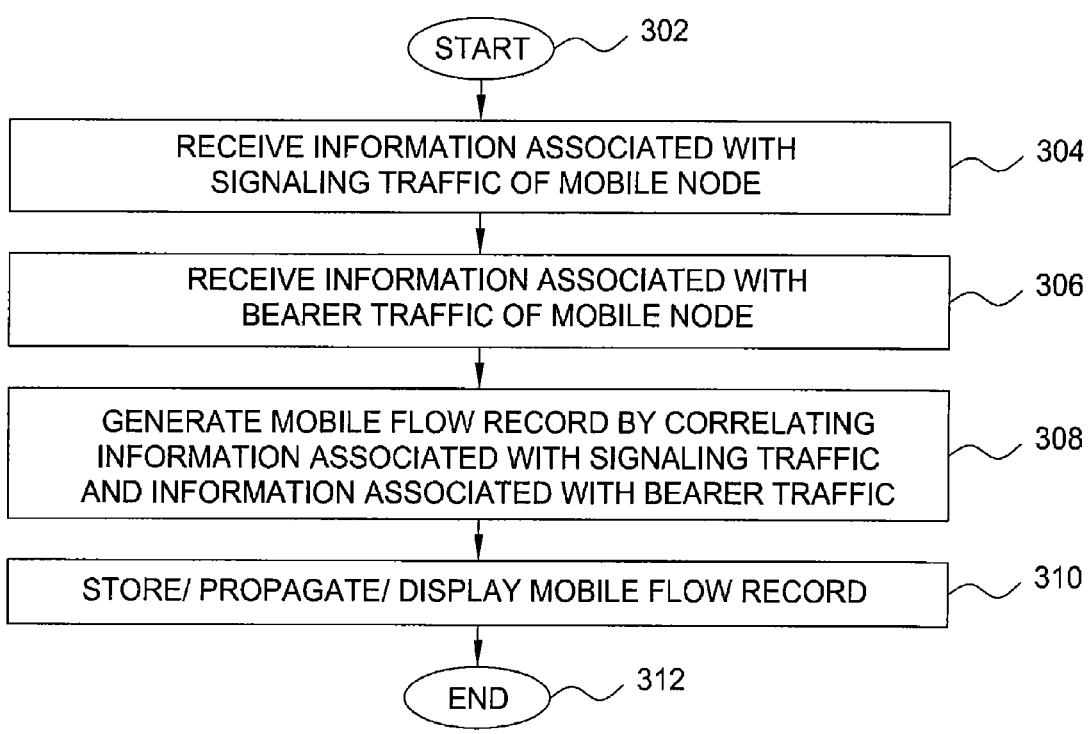
FIG. 3 depicts a high-level block diagram of one embodiment of a method for generating a mobile flow record for a mobile flow of a mobile node.

FIG. 3 depicts a high-level block diagram of one embodiment of a method for generating a mobile flow record for a mobile flow of a mobile node. Although depicted and described as being performed serially, at least a portion of the steps of method 300 may be performed contemporaneously, or in a different order than depicted and described with respect to FIG. 3. The method 300 begins at step 302. At step 304, information associated with signaling traffic of the mobile node is received. At step 306, information associated with bearer traffic of the mobile node is received. At step 308, the mobile flow record is generated by correlating the information associated with signaling traffic of the mobile node and the information associated with bearer traffic of the mobile node. In one embodiment, step 308 may be implemented using method 400 of FIG. 4, although step 308 also may be performed in any other suitable way as described herein. At step 310, the mobile flow record is handled (e.g., stored, propagated, and/or displayed, and the like). At step 312, method 300 ends. The steps of method 300 may be better understood when read in conjunction with the description of FIG. 1.

Figure 4:
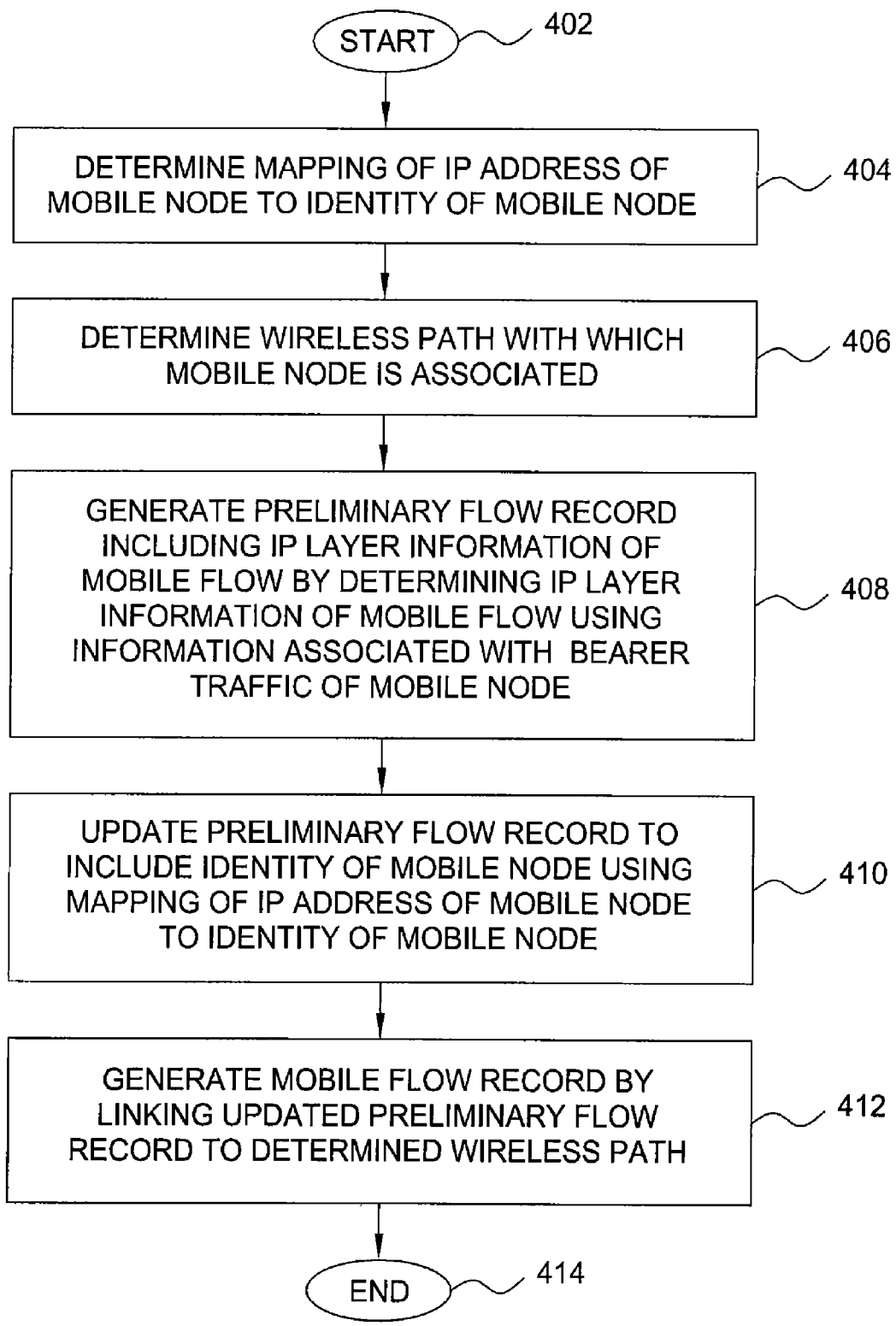
FIG. 4 depicts a high-level block diagram of one embodiment of a method for generating a mobile flow record for a mobile flow of a mobile node.

FIG. 4 depicts a high-level block diagram of one embodiment of method for generating a mobile flow record for a mobile flow of a mobile node.

As depicted in FIG. 4, method 400 is a method for generating a mobile flow record by correlating information associated with signaling traffic of the mobile node and information associated with bearer traffic of the mobile node. The generated mobile flow record includes IP layer information of the mobile flow and wireless layer information of the mobile flow.

Although depicted and described as being performed serially, at least a portion of the steps of the method 400 may be performed contemporaneously, or in a different order than depicted and described with respect to FIG. 4.

At step 402, method 400 begins.

At step 404, a mapping of an IP address of the mobile node to an identity of the mobile node (e.g., subscription and/or device identities of the mobile node) is determined using the signaling information associated with the mobile node.

At step 406, a wireless path with which the mobile node is associated is determined. In one embodiment, the wireless path is determined in real time. In one embodiment, in which the wireless path changes during the existence of the mobile flow, multiple wireless paths with which the mobile node is associated are determined.

At step 408, a preliminary flow record including the IP layer information of the mobile flow is generated by determining the IP layer information of the mobile flow using the information associated with the bearer traffic of the mobile node. The IP layer information of the mobile flow may be determined using the information associated with the bearer traffic of the mobile node by decoding at least a portion of the bearer traffic associated with the mobile node.

At step 410, the preliminary flow record is updated to include the identity of the mobile node using the mapping of the IP address of the mobile node to the identity of the mobile node.

At step 412, the mobile flow record is generated by linking the updated preliminary flow record to the determined wireless path.

At step 414, method 400 ends.

The steps of method 400 may be better understood when read in conjunction with the description of FIG. 1.

Figure 5:
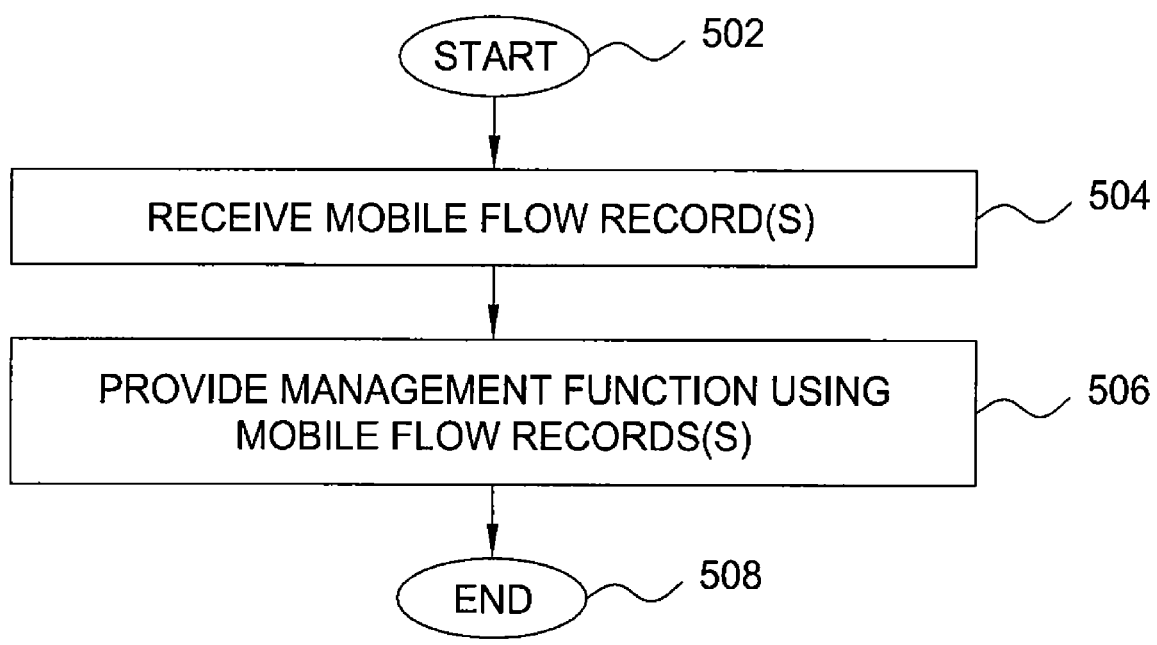
FIG. 5 depicts a high-level block diagram of one embodiment of a method for providing a management function using one or more mobile flow records.

FIG. 5 depicts a high-level block diagram of one embodiment of a method for providing a management function using one or more mobile flow records. Although depicted and described as being performed serially, at least a portion of the steps of method 400 may be performed contemporaneously, or in a different order than depicted and described with respect to FIG. 5. The method 500 begins at step 502. At step 504, one or more mobile flow records is received. At step 506, a management function is provided using the one or more mobile flow records. At step 508, method 500 ends. The steps of method 500 may be better understood when read in conjunction with the description of FIG. 1.

Although primarily depicted and described herein with respect to embodiments in which the wireless path of the mobile node does not change during the lifetime of a mobile flow, it will be understood that the wireless path of the mobile node may in fact change during the lifetime of the flow (e.g., due to the mobility of the mobile node, availability of multiple network access points by which the mobile node may access the network, and/or for any other suitable reasons). In one embodiment, in which the wireless path of a mobile node changes during the lifetime of a mobile flow, one or more interim flow records may be utilized in order to track the change(s) in the wireless path. In one such embodiment, each interim flow record may include the wireless path traversed by the packet(s) during the period when the mobile node was using that wireless path. The wireless path changes also may be tracked in any other suitable manner.

Although primarily depicted and described herein within the context of an exemplary wireless communication network architecture utilizing a specific types of wireless technology (e.g., using CDMA and/or GPRS/UMTS based wireless networks), it will be appreciated by those skilled in the art and informed by the teachings herein that the mobile flow record generation and analysis capabilities depicted and described herein may be utilized for wireless communication network architectures utilizing other types of wireless technology. For example, the mobile flow record generation and analysis capabilities depicted and described herein may be utilized in other types of CDMA wireless networks, in other types of GPRS/UMTS wireless networks, in Worldwide Interoperability for Microwave Access (WiMAX) wireless networks, and the like, as well as various combinations thereof also will be appreciated that the network elements from which the relevant information (e.g., the information associated with signaling traffic and/or the information associated with bearer traffic) is obtained may be different in other types of wireless networks. Thus, references herein to BSs and RNCs, and similar network elements, may be read more generally as references to radio access nodes and controllers, respectively.

Although primarily depicted and described herein with respect to embodiments in which a mobile node participates in a single mobile flow while connected to the network, it will be appreciated that a mobile node may participate in multiple mobile flows while connected to the network. In such embodiments, the multiple mobile flows may be handled in any suitable manner, such as creating separate mobile flow records for each mobile flow, creating one aggregate mobile flow record for the multiple mobile flows, and the like, as well as various combinations thereof.

Although primarily depicted and described herein with respect to IP packet flows, the mobile flow record generation and analysis capabilities depicted and described herein may be utilized for mobile flow record generation and analysis for packet flows that employ other types of packets. In such embodiments, at least a portion of the IP layer information and/or at least a portion of the wireless layer information included in the mobile flow record may be different than depicted and described herein.

Figure 6:
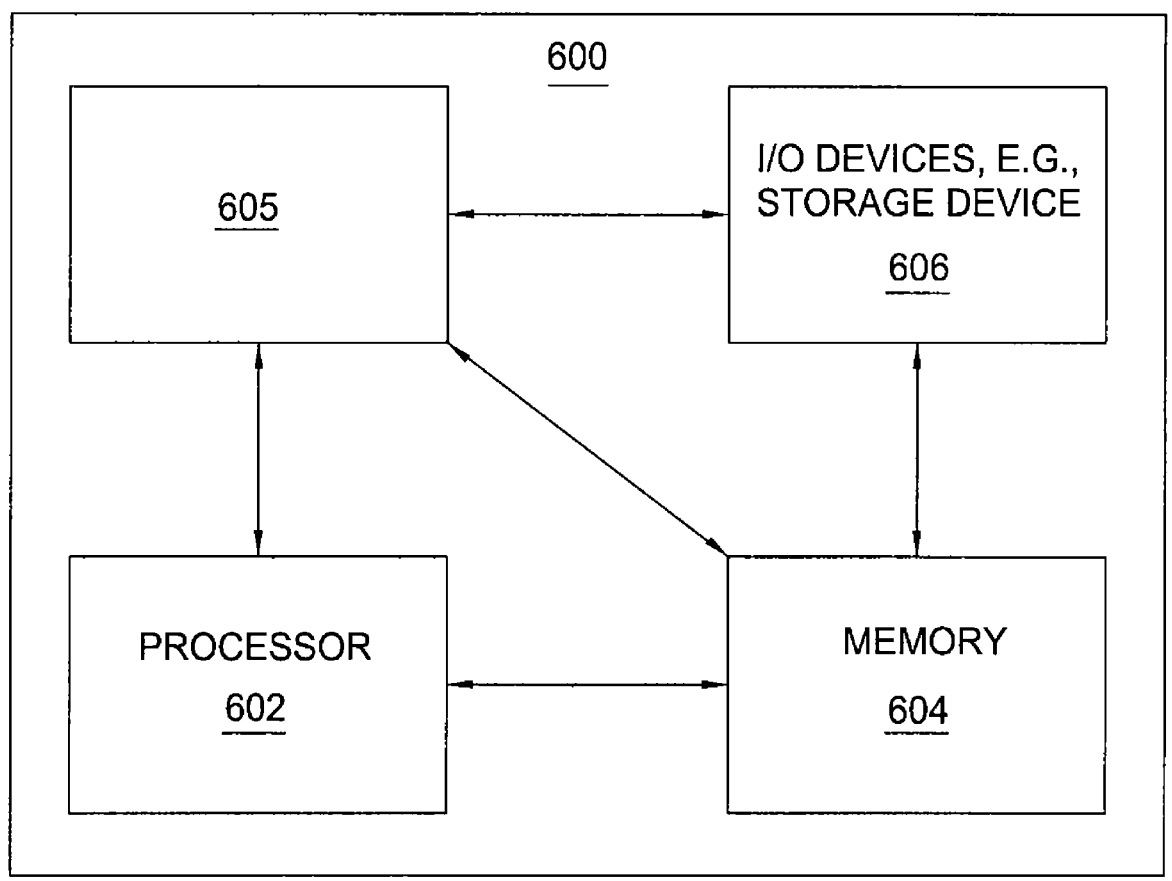
FIG. 6 depicts a high-level block diagram of a general-purpose computer suitable for use in performing the functions described herein.

FIG. 6 depicts a high-level block diagram of a computer suitable for use in performing the functions described herein. As depicted in FIG. 6, computer 600 includes a processor element 602 (e.g., a central processing unit (CPU) or other suitable processor(s)), a memory 604 (e.g., random access memory (RAM) and/or read only memory (ROM)), mobile flow record module/process 605 adapted for generating and/or analyzing mobile flow records, and various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It should be noted that functions depicted and described herein may be implemented in software and/or in a combination of software and hardware, e.g., using a general purpose computer, one or more application specific integrated circuits (ASIC), and/or any other hardware equivalents. In one embodiment, a mobile flow record process 605 can be loaded into memory 604 and executed by processor 602 to implement the functions as discussed herein above. Thus, mobile flow record process 605 (including associated data structures) can be stored on a computer readable storage medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for generating a mobile flow record for a mobile flow of a mobile node, comprising:
   receiving information associated with signaling traffic of the mobile node;
   receiving information associated with bearer traffic of the mobile node; and
   generating the mobile flow record by correlating the information associated with signaling traffic of the mobile node and the information associated with bearer traffic of the mobile node;
   wherein the mobile flow record comprises IP layer information associated with the mobile flow and wireless layer information associated with the mobile flow.

2. The method of claim 1, wherein the IP layer information comprises at least one of:
   a five-tuple comprising a source IP address, a source port, a destination IP address, a destination port, and protocol;
   an arrival time of the first packet of the mobile flow;
   an arrival time of the last packet of the mobile flow;
   a packet/byte count of the mobile flow; and
   one or more TCP flags.

3. The method of claim 1, wherein the wireless layer information comprises at least one of:
   information indicative of wireless resource consumption of the mobile flow in the wireless network;
   identity information associated with the mobile flow in the wireless network;
   information indicative of the path traversed by the mobile flow in the wireless network; and
   performance information comprising at least one of throughput information, delay information, and loss information.

4. The method of claim 1, wherein the IP layer information is determined using information from at least one of:
   at least one network element of a radio access network traversed by the mobile flow; and
   at least one network element of a core network traversed by the mobile flow.

5. The method of claim 1, wherein the wireless layer information is determined using information from at least one of:
   at least one network element of a radio access network traversed by the mobile flow; and
   at least one network element of a core network traversed by the mobile flow.

6. The method of claim 1, wherein generating the mobile flow record by correlating the information associated with signaling traffic of the mobile node and the information associated with bearer traffic of the mobile node comprises:
   determining a mapping of an IP address of the mobile node to an identity of the mobile node using the signaling information associated with the mobile node;
   determining, in real-time, a wireless path with which the mobile node is associated;
   generating a preliminary flow including the IP layer information of the mobile flow by determining the IP layer information of the mobile flow using the information associated with the bearer traffic of the mobile node;
   updating the preliminary flow record to include the identity of the mobile node using the mapping of the IP address of the mobile node to the identity of the mobile node; and
   generating the mobile flow record by linking the updated preliminary flow record to the determined wireless path.

7. The method of claim 1, wherein the mobile node is associated with a first wireless path during a first time interval during which the mobile flow is active and is associated with a second wireless path during a second time interval during which the mobile flow is active, wherein generating the mobile flow record by correlating the information associated with signaling traffic of the mobile node and the information associated with bearer traffic of the mobile node comprises:
   determining the first wireless path of the mobile node during the first time interval;
   maintaining a first interim flow record associated with the first wireless path;
   determining the second wireless path of the mobile node during the second time interval; and
   maintaining a second interim flow record associated with the second wireless path.

8. The method of claim 1, further comprising:
   propagating the mobile flow record toward at least one remote system.

9. An apparatus for generating a mobile flow record for a mobile flow of a mobile node, comprising:
   means for receiving information associated with signaling traffic of the mobile node;
   means for receiving information associated with bearer traffic of the mobile node; and
   means for generating the mobile flow record by correlating the information associated with signaling traffic of the mobile node and the information associated with bearer traffic of the mobile node;
   wherein the mobile flow record comprises IP layer information associated with the mobile flow and wireless layer information associated with the mobile flow.

10. The apparatus of claim 9, wherein the IP layer information comprises at least one of:
    a five-tuple comprising a source IP address, a source port, a destination IP address, a destination port, and protocol;
    an arrival time of the first packet of the mobile flow;
    an arrival time of the last packet of the mobile flow;
    a packet/byte count of the mobile flow; and
    one or more TCP flags.

11. The apparatus of claim 9, wherein the wireless layer information comprises at least one of:
    information indicative of wireless resource consumption of the mobile flow in the wireless network;
    identity information associated with the mobile flow in the wireless network;
    information indicative of the path traversed by the mobile flow in the wireless network; and
    performance information comprising at least one of throughput information, delay information, and loss information.

12. The apparatus of claim 9, wherein the IP layer information is determined using information from at least one of:
    at least one network element of a radio access network traversed by the mobile flow; and
    at least one network element of a core network traversed by the mobile flow.

13. The apparatus of claim 9, wherein the wireless layer information is determined using information from at least one of:
    at least one network element of a radio access network traversed by the mobile flow; and
    at least one network element of a core network traversed by the mobile flow.

14. The apparatus of claim 9, wherein the means for generating the mobile flow record by correlating the information associated with signaling traffic of the mobile node and the information associated with bearer traffic of the mobile node comprises:
  means for determining a mapping of an IP address of the mobile node to an identity of the mobile node using the signaling information associated with the mobile node;
  means for determining, in real-time, a wireless path with which the mobile node is associated;
  means for generating a preliminary flow including the IP layer information of the mobile flow by determining the IP layer information of the mobile flow using the information associated with the bearer traffic of the mobile node;
  means for updating the preliminary flow record to include the identity of the mobile node using the mapping of the IP address of the mobile node to the identity of the mobile node; and
  means for generating the mobile flow record by linking the updated preliminary flow record to the determined wireless path.

15. The apparatus of claim 9, wherein the mobile node is associated with a first wireless path during a first time interval during which the mobile flow is active and is associated with a second wireless path during a second time interval during which the mobile flow is active, wherein the means for generating the mobile flow record by correlating the information associated with signaling traffic of the mobile node and the information associated with bearer traffic of the mobile node comprises:
  means for determining the first wireless path of the mobile node during the first time interval;
  means for maintaining a first interim flow record associated with the first wireless path;
  means for determining the second wireless path of the mobile node during the second time interval; and
  means for maintaining a second interim flow record associated with the second wireless path.

16. The apparatus of claim 9, further comprising:
  means for propagating the mobile flow record toward at least one remote system.

17. A non-transitory computer-readable storage medium storing a software program that, when executed by a computer, causes the computer to perform a method for generating a mobile flow record for a mobile flow of a mobile node, the method comprising:
  receiving information associated with signaling traffic of the mobile node;
  receiving information associated with bearer traffic of the mobile node; and
  generating the mobile flow record by correlating the information associated with signaling traffic of the mobile node and the information associated with bearer traffic of the mobile node;
  wherein the mobile flow record comprises IP layer information associated with the mobile flow and wireless layer information associated with the mobile flow.

18. The non-transitory computer-readable storage medium of claim 17, wherein the IP layer information comprises at least one of:
  a five-tuple comprising a source IP address, a source port, a destination IP address, a destination port, and protocol;
  an arrival time of the first packet of the mobile flow;
  an arrival time of the last packet of the mobile flow;
  a packet/byte count of the mobile flow; and
  one or more TCP flags.

19. The non-transitory computer-readable storage medium of claim 17, wherein the wireless layer information comprises at least one of:
  information indicative of wireless resource consumption of the mobile flow in the wireless network;
  identity information associated with the mobile flow in the wireless network;
  information indicative of the path traversed by the mobile flow in the wireless network; and
  performance information comprising at least one of throughput information, delay information, and loss information.

20. The non-transitory computer-readable storage medium of claim 17, wherein the IP layer information is determined using information from at least one of:
  at least one network element of a radio access network traversed by the mobile flow; and
  at least one network element of a core network traversed by the mobile flow.

21. The non-transitory computer-readable storage medium of claim 17, wherein the wireless layer information is determined using information from at least one of:
  at least one network element of a radio access network traversed by the mobile flow; and
  at least one network element of a core network traversed by the mobile flow.

22. The non-transitory computer-readable storage medium of claim 17, wherein generating the mobile flow record by correlating the information associated with signaling traffic of the mobile node and the information associated with bearer traffic of the mobile node comprises:
  determining a mapping of an IP address of the mobile node to an identity of the mobile node using the signaling information associated with the mobile node;
  determining, in real-time, a wireless path with which the mobile node is associated;
  generating a preliminary flow including the IP layer information of the mobile flow by determining the IP layer information of the mobile flow using the information associated with the bearer traffic of the mobile node;
  updating the preliminary flow record to include the identity of the mobile node using the mapping of the IP address of the mobile node to the identity of the mobile node; and
  generating the mobile flow record by linking the updated preliminary flow record to the determined wireless path.

23. The non-transitory computer-readable storage medium of claim 17, wherein the mobile node is associated with a first wireless path during a first time interval during which the mobile flow is active and is associated with a second wireless path during a second time interval during which the mobile flow is active, wherein generating the mobile flow record by correlating the information associated with signaling traffic of the mobile node and the information associated with bearer traffic of the mobile node comprises:
  determining the first wireless path of the mobile node during the first time interval;
  maintaining a first interim flow record associated with the first wireless path;
  determining the second wireless wireless path of the mobile node during the second time interval; and
  maintaining a second interim flow record associated with the second wireless path.

24. The non-transitory computer-readable storage medium of claim 17, the method further comprising:
  propagating the mobile flow record toward at least one remote system.

* * * * *